United States Patent [19]

Shugarman

[11] Patent Number: 4,704,260

[45] Date of Patent: Nov. 3, 1987

[54] LEAD REMOVAL METHOD

[75] Inventor: Arnold L. Shugarman, Santa Ana, Calif.

[73] Assignee: Union Oil Company of California, Los Angeles, Calif.

[21] Appl. No.: 565,028

[22] Filed: Dec. 20, 1983

[51] Int. Cl.$^4$ .............................................. C01G 21/00
[52] U.S. Cl. .......................................... 423/92; 423/55; 423/98; 75/2; 75/101 R; 75/108; 75/120
[58] Field of Search ....................... 423/53, 54, 55, 56, 423/92, 98; 75/1 R, 2, 101 R, 108, 103, 120, 121, 101 BE

[56] References Cited

U.S. PATENT DOCUMENTS

| | | | |
|---|---|---|---|
| 3,438,811 | 4/1969 | Harriman et al. | 75/117 |
| 3,607,069 | 9/1971 | Bruen et al. | 75/121 |
| 3,634,070 | 1/1972 | Lindstrom et al. | 75/108 |
| 4,124,408 | 11/1978 | Eaton et al. | 134/3 |

OTHER PUBLICATIONS

Bailor, C. J., Jr. et al., *Comprehensive Inorganic Chemistry*, Pergamon Press, Great Britain, 1973, vol. III, pp. 700–710, 719–723, & 736–739.

Dwyer, F. P. et al, *Chelating Agents and Metal Chelates*, Academic Press, New York, 1964, pp. 304–305.

*Chemical Abstracts* 85: 127643X (1976).

L. L. Duda and A. Bartecki, "Dissolution of $Cu_2S$ in Aqueous EDTA Solutions Containing Oxygen" in *Hydrometallrugy*, vol. 8, pp. 341–354 (1982).

A. Nixon, D. Keller and A. Corsini, "The Recovery of Radium and EDTA from Radium Leach Solutions" in *Hydrometallurgy*, vol. 11, pp. 33–45 (1983).

*Primary Examiner*—Robert L. Stoll
*Attorney, Agent, or Firm*—Dean Sandford; Gregory F. Wirzbicki; Robert A. Franks

[57] ABSTRACT

A method is provided for the removal of lead contaminants from ores and mineral concentrates, comprising leaching the concentrates, at elevated temperatures, with an aqueous solution containing an aminopolycarboxylic acid. After separating the solution from the concentrates, lead can be precipitated by treating the solution with a sulfide; the solution can be recycled for use as a leachant.

25 Claims, No Drawings

LEAD REMOVAL METHOD

BACKGROUND OF THE INVENTION

1. Field of the Invention

The invention relates to a hydrometallurgical method for removing contaminants from ores and mineral concentrates. More particularly, the invention relates to the leaching of lead components from ores and mineral concentrates.

2. Description of the Art

The majority of the world's molybdenum supply originates in molybdenum sulfide mineral deposits, primarily containing molybdenum disulfide, or molybdenite. Sulfide ores normally contain their molybdenum values in very low concentrations and, therefore, require concentration procedures for eliminating the "gangue" materials. Flotation concentration is widely used to produce a molybdenum sulfide material, which can be used in lubricants or economically processed for conversion into molybdenum oxide or other marketable compounds.

Molybdenum sulfide concentrates, however, can have rather stringent requirements for purity, depending upon the ultimate use which is contemplated for the material. The large quantities of molybdenum sulfide, which are roasted to form molybdenum oxide and converted into alloys for the steel industry, are generally specified to contain no more than about 0.05 percent by weight lead. Molybdenite flotation concentrates, depending upon their mineral origin, contain about 0.1 to about 0.8 percent by weight lead, presumably present as lead sulfide. It is, therefore, necessary to provide some treatment to remove lead, either from the sulfide concentrates or from the roasted oxide products.

Most of the available methods for lead removal involve treatment with a halide substance. U.S. Pat. No. 3,674,424 to Stanley et al. teaches the use of an aqueous solution containing an alkali or alkaline earth chloride, plus either cupric or ferric chloride, as a leachant for impurity removal from molybdenite concentrates. Kentro, in U.S. Pat. No. 3,854,930, teaches lead removal from molybdenite, by leaching with hydrochloric or nitric acid, after treatment of the concentrates with ammonium chloride; U.S. Pat. No. 3,911,076 to Probert et al. is directed to a similar process. Wesely, in U.S. Pat. No. 4,083,921, heats a mixture of a chloride salt and molybdenum flotation concentrates, converting impurities into a form which is soluble in an acidic, oxidizing chloride solution.

Another method for treating molybdenite flotation concentrates is that of Queneau et al., in U.S. Pat. No. 3,834,893, wherein concentrates and sulfuric acid are roasted together, at a temperature insufficient to oxidize large amounts of molybdenum sulfide. Impurities can be leached out in two steps: first, with water and, subsequently, using hydrochloric acid. Following these steps, however, a second flotation separation is needed to recover the purified molybdenum sulfide.

Methods are known for recovering lead from its sulfide ores, including that of U.S. Pat. No. 3,933,973 to Evans et al., wherein oxygen and an acidic acetate solution react with lead sulfide, producing lead acetate and elemental sulfur. This method has been found to be ineffective for removing lead from molybdenum sulfide materials.

Lindstrom et al., in U.S. Pat. No. 3,934,070, describe a process for recovering copper from ores and ore concentrates which have adequate solubility in water. The method involves contacting the ore material with an aqueous solution of ethylenediaminetetraacetic acid ("EDTA") to dissolve copper components, and raising the solution pH to precipitate copper hydroxide. This method is said to be useful for recovering manganese, iron, cobalt, nickel, copper, and zinc from their carbonates, oxides, hydroxides, and silicates.

An abstract of a paper by Bartecki et al. (*Chemical Abstracts* 85:127643x) describes conditions for the recovery of copper from flotation wastes, by leaching with EDTA solutions. It is stated that EDTA leaches only copper from the wastes. Following this paper, two of its authors, L. J. Duda and Adam Bartecki, published "Dissolution of $Cu_2S$ in Aqueous EDTA Solutions Containing Oxygen," in *Hydrometallurgy*, Vol. 8, pp. 341–354 (1982), to discuss the mechanism of cuprous sulfide dissolution.

Chelating agents, including EDTA, have been used to remove copper and copper compounds from steam generating equipment, as described by Harriman et al. in U.S. Pat. No. 3,438,811. Eaton et al., in U.S. Pat. No. 4,124,408, teach the removal of deposits from refrigeration system surfaces, using solutions or slurrys of EDTA.

It is clear that most of the usual techniques for lead removal from ores involve highly corrosive halide compounds. Further, such compounds are not normally easily recovered for recycle to the lead removal stages, causing economic inefficiency and difficult disposal and pollution problems. Since disposal options for toxic substances, such as lead compounds, are somewhat limited, lead typically will be concentrated and separated by neutralizing a hydrochloric acid solution; such action prevents recycling the acid. In addition, the leaching of molybdenite concentrates results in a significant solubilization of molybdenum, which is difficult to recover from solutions such as hydrochloric acid.

Accordingly, it is an object of the present invention to provide a method for removing lead from ores, using reagents which have low corrosivity toward usual construction materials.

It is a further object to provide a lead removal method which minimizes disposal and pollution problems.

Another object is to provide a method which permits the recovery of mineral values which may be solubilized during lead removal.

These and other objects will appear to those skilled in the art, from consideration of the following description and claims.

SUMMARY OF THE INVENTION

In accordance with the invention, lead is removed from ores and mineral concentrates by leaching with an aqueous solution containing an aminopolycarboxylic acid, or a salt thereof. Leaching is typically conducted at an elevated temperature, i.e., about 50° C. to about the solution boiling point.

After separation from the ores or concentrates, leachate can be treated with a sulfide to precipitate lead and, following removal of the precipitate, can be recycled for reuse.

DESCRIPTION OF THE INVENTION

The invention relates to lead component removal from ores and mineral concentrates, primarily where the lead component is a contaminant, i.e., at low concentrations. The method of the invention is most applicable to lead removal from metal sulfide ores and concentrates, and has been found to be particularly useful for upgrading molybdenum sulfide flotation concentrates.

The method typically will be used to treat mineral concentrates, obtained from ores by techniques such as flotation, jigging, tabling, heavy-media separation, and the like. This is normally solely a matter of economics, since an ore frequently contains only a very small concentration of the desired component, and treatment of the unseparated ore is much more difficult and expensive than treating a concentrate. However, the present method can be used to treat ores having sufficiently high grades that concentration is not required; for this reason, the terms "ores" and "mineral concentrates" will be considered equivalent herein.

Ore or concentrates can contain significant amounts of materials which readily react with aminopolycarboxylic acid solutions, but which are also water-soluble or soluble in dilute acids. Examples of such materials are calcium and magnesium compounds, including their oxides, hydroxides, sulfates, phosphates and carbonates. If allowed to remain in the ores or concentrates, these materials will consume quantities of aminopolycarboxylic acid which otherwise would be available for the leaching of lead and, in addition, will tend to complicate the later procedure for regenerating leaching solution. Therefore, it is advisable to eliminate as much water-soluble material as possible, by means of a "pretreatment" leaching step, using water, dilute acid solutions, and the like. The pretreatment solution is preferably one which will not react to a large extent with the desired product components of the ores or concentrates.

Suitable aminopolycarboxylic acids for the practice of this invention are those which have chelating ability and which, either in the acid form or as a salt, have sufficient solubility in water to produce an effective leachant. Commercially available compounds which are useful include, but are not limited to, iminodiacetic acid, methyliminodiacetic acid, nitrilotriacetic acid, ethylenediaminetetraacetic acid, diethylenetriaminepentaacetic acid, 1,2-diaminocyclohexanetetraacetic acid, N-hydroxyethylenediaminetriacetic acid, and related compounds. In the remainder of this description, the invention will be described primarily with reference to the use of ethylenediaminetetraacetic acid (EDTA) and its salts; it is to be understood that the invention is not limited to the use of only EDTA. It should also be understood that the term "aminopolycarboxylic acid" is meant to include mixtures of two or more such acids.

In the method, lead is solubilized by leaching with aqueous solutions containing aminopolycarboxylic acid or aminopolycarboxylic acid salts having pH values above about 4. Preferably, the pH is above about 7. After separation of leachate from the leached ore or concentrate, lead and other solubilized materials can be removed, regenerating the solution for recycling to the leaching step.

While alkaline pH values are preferred, lead extraction can be obtained in weakly acidic solutions, as shown in the examples, infra. As will be described, alkaline solutions not only are more efficient for lead leaching, but also are preferred for the handling of contaminants in the solution, during regeneration operations.

Aqueous EDTA solution, having a concentration about 0.05 to about 0.3 Molar, is mixed with ore or mineral concentrate, forming a slurry which has a concentration of solids in the range about 2 to about 50 percent by weight. Leaching efficiency is improved by higher molar ratios of EDTA to lead; ratios above about 20 are suitable in the present method. Leaching is conducted, with mixing, at temperatures in the range 50° C. to about the solution boiling point.

Following the leaching operation, slurry is transferred to equipment for separating the solid and liquid phases. Any of the phase separating devices commonly used in the art, such as filters, centrifuges, and the like, can be used. Solid products are normally washed with water to remove residual EDTA and sodium ions, after which they can be shipped or used in conversion processes, with or without additional preparative steps, such as drying, grinding, and the like.

The liquid phase is treated for regeneration of the EDTA, since the cost of this reagent prohibits its disposal after only one leach cycle. In addition, since lead is considered to be a toxic waste material, disposal of the lead-containing EDTA would be a very costly procedure. Typically, the EDTA solution, after treating molybdenite flotation concentrate, contains the contaminants molybdenum, calcium, magnesium, and iron, as well as lead and associated heavy metals. Molybdenum, above pH 10, does not strongly affect the ability of EDTA to complex cations, but, as its concentration builds in the solution, will eventually cause saturation and the attendant precipitation problems. Other contaminants of the solution complex with EDTA, reducing its capacity for lead extraction, and, therefore, should be removed.

Molybdenum can be removed from the EDTA solution, at pH values below about 7, by displacing molybdate from its EDTA complex with, for example, ferric ions, and adding lead ions to precipitate lead molybdate. If molybdenum removal precedes other steps in the regeneration procedure, excess iron and lead can be removed in subsequent steps. Alternatively, if it is not desired to remove molybdenum after the molybdate concentration has built up in the solution, a constant bleed stream can be removed from the otherwise regenerated EDTA which is recycled to the leach operation. Replacement of the bleed stream volume with fresh EDTA solution will maintain a desired maximum molybdate ion concentration.

Iron and magnesium concentrations in the EDTA solution can be reduced by hydrolysis. Using an alkali hydroxide solution, the pH is raised to yield precipitates of hydrous ferric oxide and magnesium hydroxide. The pH which gives fairly complete precipitation is dependent upon the molar ratio of EDTA to the metals; at very low ratios, iron for example, will be precipitated at acid pH values. With high ratios, pH values above 12 can be required. These precipitates can be separated by methods well known in the art, such as centrifugation, filtration, settling (with or without added flocculation agents), and the like. The precipitate is discarded, and clarified solution is passed on to further recovery operations.

Lead and associated heavy metals are removed from the solution by precipitation as the sulfides, normally using hydrogen sulfide or a water-soluble sulfide salt, preferably in the presence of flocculating agents. It is preferred to use the lower cost sulfide materials, such as hydrogen sulfide, ammonium sulfides (including polysulfides), sodium sulfides, and/or potassium sulfides. Using sodium sulfide, the precipitation of lead is believed to proceed as follows:

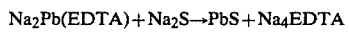

Na$_2$Pb(EDTA)+Na$_2$S→PbS+Na$_4$EDTA

The pH at which metal sulfides are efficiently precipitated is dependent upon the concentration of uncomplexed EDTA in the solution. In the absence of EDTA, lead sulfide can be quantitatively precipitated from 0.1 Molar acid solutions. In general, the pH should be above about 11 for fairly complete heavy metal precipitation in the presence of uncomplexed EDTA. After separation of the sulfide precipitate, by filtration or other procedures well known in the art, the EDTA solution can be recycled for use in leaching additional quantities of ores and concentrates. Toxic heavy metals are recovered in a compact form, to simplify their disposal.

The invention is further illustrated by the following examples, which are illustrative of various aspects of the invention and are not intended as limiting the scope of the invention as defined in the appended claims.

EXAMPLE I

An experiment is performed to compare various reagents for lead removal from ores and ore concentrates.

In tests A through G, a 10 gram portion of molybdenite flotation concentrate, containing 0.55 percent by weight lead, is washed with acetone to remove oils, dried, and suspended in 90 grams of extractant solution, having a concentration sufficient to provide a molar ratio of extractant compound to lead of about 100. Extraction is conducted at about 90° C. to 100° C. for a predetermined time, in an air atmosphere and with continuous stirring. At the conclusion of each test, the solution is removed by filtration, and the solid residue is analyzed to determine its lead content.

Test H is conducted in a stirred autoclave, using 17.5 grams molybdenite concentrate in 300 milliliters of 0.3 Molar acetic acid, under an oxygen atmosphere at 230 p.s.i.g.

Results are summarized as shown in Table 1.

TABLE 1

| Test | Extractant | Temp, °C. | Time, Hours | Initial pH | Residue wt % Pb |
|---|---|---|---|---|---|
| A | Na$_2$H$_2$EDTA | 90 | 1 | 4.6 | 0.078 |
| B | Na$_4$EDTA | 90 | 1 | 11.4 | 0.058 |
| C | (NH$_4$)$_4$EDTA | 90 | 1 | 9.1 | 0.085 |
| D | Nitrilotriacetic Acid | 90 | 1 | 10.5 | 0.085 |
| E | Sodium Citrate | 100 | 6 | 9.1 | 0.54 |
| F | Glycollic Acid | 100 | 6 | 2.3 | 0.55 |
| G | Sodium Glycollate | 100 | 6 | 11.2 | 0.50 |
| H | Acetic Acid | 200 | 3 | 2.6 | 0.53 |

These results show that aminopolycarboxylic acids can be used to remove lead, but that other complexing agents, containing carboxylic acid functions, are ineffective lead extractants. Acetic acid, described in the art (Evans et al., U.S. Pat. No. 3,933,973, discussed supra) as being useful for recovering lead from its sulfide ores, exhibits only a very small effect on the lead content of the concentrate of this example. It appears that reagents which do not contain the nitrogen function are not satisfactory for a lead removal method.

EXAMPLE II

The effect of processing variables upon lead extraction is studied, using the molybdenite concentrate of the preceding example.

Concentrate is suspended in an aqueous solution of Na$_4$EDTA, producing a suspension having a solids content of about 10 percent by weight, and varying molar ratios of EDTA to lead. Except for test B, in which the test is conducted under 1 atmosphere pressure of nitrogen, all tests are under 1 atmosphere of oxygen.

Results are summarized in Table II.

TABLE II

| Test | [EDTA]/[Pb] | Temp., °C. | Time, Hours | Initial pH | Residue wt.% Pb |
|---|---|---|---|---|---|
| A | 100 | 90 | 1 | 11.4 | 0.058 |
| B | 100 | 90 | 1 | 10.7 | 0.076 |
| C | 100 | 90 | 3 | 11.4 | 0.061 |
| D | 100 | 90 | 6 | 11.4 | 0.064 |
| E | 20 | 90 | 1 | 11.0 | 0.066 |
| F | 5 | 90 | 1 | 11.1 | 0.42 |
| G | 100 | 77 | 1 | 12.0 | 0.082 |
| H | 100 | 54 | 3 | 11.7 | 0.095 |

These results show that, in general, effective extraction using EDTA occurs when the molar ratio of EDTA to lead is in the range of about 20 to 100; within this range at least about 90 percent of the lead can be extracted in one at 90° C. Oxygen appears to promote the extraction of lead, but is not essential in the method. Further, lead extraction is increased at higher temperatures, but leaching times in excess of about one hour are probably not necessary.

It is likely that the relatively poorer results obtained at lower EDTA concentrations is due to consumption of EDTA by calcium and other extractable materials. The results, therefore, should not be considered as generally applicable, since other ores and concentrates can contain considerably different amounts of extractable materials. In addition, other aminopolycarboxylic acids tend to extract different materials in different proportions. Tests should be conducted with particular extractants before the method is adopted for treating an ore or concentrate.

EXAMPLE 3

Tests are conducted to determine the effect of calcium and molybdenum on lead extraction.

The molybdenite concentrate of Example 1 is leached with Na$_4$EDTA solution at 10 percent by weight solids, at a temperature of 90° C., under air at atmospheric pressure, for varying periods of time and at varying molar ratios of EDTA to lead. Solutions of calcium hydroxide and sodium molybdate are added at the beginning of certain tests, to obtain predetermined molarities in the EDTA solution.

Results are summarized in Table 3.

TABLE 3

| Addition Element | Molarity | [EDTA]/[Pb] | Time, Hours | Initial pH | Residue wt. % Pb |
|---|---|---|---|---|---|
| None | — | 20 | 1 | 11.0 | 0.066 |
| Ca | 0.062 | 20 | 1 | 12.4 | 0.41 |
| Ca | 0.600 | 100 | 3 | 4.4 | 0.16 |
| Mo | 0.044 | 20 | 1 | 10.8 | 0.066 |

Calcium is seen as severely inhibiting lead extraction at high pH values, where calcium forms strongly-bound complexes with EDTA, but inhibiting to a lesser degree at low pH values. Molybdate, however, which begins to complex with EDTA only below pH 10, does not significantly affect the leaching of lead at higher pH values.

EXAMPLE IV

An experiment is performed to demonstrate methods for the removal of calcium from ores, prior to lead leaching steps.

A molybdenite flotation concentrate, containing 0.46 percent by weight calcium, is added to water and various solutions, to form slurries containing 10 percent by weight solids. The slurries are stirred for a predetermined time, after which solids are separated by filtration and analyzed to determine their calcium content. Results are summarized as in Table 4.

TABLE 4

| Solution | | Temp., | Time, | Initial | Residue |
|---|---|---|---|---|---|
| Solute | Molarity | °C. | Hours | pH | wt. % Ca |
| Na$_4$EDTA | 0.12 | 90 | 2 | 12.5 | 0.14 |
| HO | — | 20 | 7 | 4.4 | 0.23 |
| HCl | 0.14 | 20 | 17 | 0.8 | 0.19 |
| CH$_3$COOH | 0.35 | 20 | 6 | 2.7 | 0.25 |
| Na (Citrate) | 0.14 | 20 | 18 | 6.8 | 0.25 |

Calcium can extracted from the concentrates using water or dilute acid solutions. Use of such extraction, prior to lead removal with aminopolycarboxylic acid solutions, will minimize consumption of costly reagents.

EXAMPLE V

An experiment is conducted to compare lead dissolution in aminopolycarboxylic acid solution from lead sulfide (as the mineral galena) and from molybdenite concentrates.

Lump galena, ground and sized (using sieves), and the concentrates of Example 1 are leached with an aqueous Na$_4$EDTA solution for 3 hours at 90° C., using a molar ratio of EDTA to lead about 100. Results are summarized as in Table 5.

TABLE 5

| Material | PbS Particle Size, microns | % Pb Extracted |
|---|---|---|
| PbS | 74–147 | 11 |
| PbS | <37 | 35 |
| MoS$_2$ | 1–20 (estimated) | 92 |

Lead removal from molybdenite is more efficient than from galena. The reason for this is not known with any certainty, but is likely a function of particle size and/or the actual mineral composition of molybdenite.

Various embodiments and modifications of this invention have been described in the foregoing discussion and examples, and further modifications will be apparent to those skilled in the art. Such modifications are included within the scope of the invention, as defined by the following claims.

What is claimed is:

1. A method for removing lead components from ores, comprising treating the ores with an aqueous solution containing an aminopolycarboxylic acid or salts thereof, and separating ores having a reduced lead content.

2. The method defined in claim 1, wherein the aminopolycarboxylic acid is selected from the group consisting of iminodiacetic acid, methyliminodiacetic acid, nitrilotriacetic acid, ethylenediaminetetraacetic acid, diethylenetriaminopentaacetic acid, 1,2-diaminocyclohexanetetraacetic acid, and N-hydroxyethylenediaminetriacetic acid.

3. The method defined in claim 2, wherein the aminopolycarboxylic acid comprises ethylenediaminetetraacetic acid.

4. The method defined in claim 2, wherein the aminopolycarboxylic acid comprises nitrilotriacetic acid.

5. The method defined in claim 1, wherein ores comprise mineral concentrates obtained from flotation concentration procedures.

6. The method defined in claim 5, wherein the concentrates comprise molybdenum sulfides.

7. The method defined in claim 1, wherein the treating is conducted at elevated temperatures.

8. The method defined in claim 7, wherein the temperatures are about 50° C. to about the boiling point of the solution.

9. The method defined in claim 1, wherein the solution is separated from the ores, after treatment, and lead and heavy metals contained in the solution are removed.

10. The method defined in claim 9, wherein lead and heavy metals are removed by precipitation with a sulfide material.

11. The method defined in claim 10, wherein the sulfide material is selected from the group consisting of sodium sulfide, potassium sulfides, ammonium sulfides, hydrogen sulfide, and mixtures thereof.

12. A method for removing lead components from ores, comprising treating the ores with an aqueous solution containing an aminopolycarboxylic acid or salts thereof, at temperatures about 50° C. to about the solution boiling point, separating ores having a reduced lead content from the solution, regenerating the solution by removing contaminants, and recycling the regenerated solution for treating additional quantitites of ores.

13. The method defined in claim 12, wherein the aminopolycarboxylic acid is selected from the group consisting of iminodiacetic acid, methyliminodiacetic acid, nitrilotriacetic acid, ethylenediaminetetraacetic acid, diethylenetriaminopentaacetic acid, 1,2-diaminocyclohexanetetraacetic acid, and N-hydroxyethylenediaminetriacetic acid.

14. The method defined in claim 13, wherein the aminopolycarboxylic acid comprises ethylenediaminetetraacetic acid.

15. The method defined in claim 12, wherein ores comprise molybdenum sulfide flotation concentrates.

16. The method defined in claim 12, wherein lead and heavy metal contaminants are removed from the solution by precipitation with a sulfide material, selected from the group consisting of sodium sulfides, potassium sulfides, ammonium sulfides, hydrogen sulfide, and mixtures thereof.

17. A method for removing lead components from flotation concentrates comprising molybdenum sulfide, the method comprising the steps of:
  (a) leaching concentrates with an aqueous solution of ethylenediaminetetraacetic acid or salts thereof, at temperatures about 50° C. to about the solution boiling point;
  (b) separating concentrates having a reduced lead content from the solution;

(c) regenerating the solution by removing contaminants; and
(d) recycling the regenerated solution for treating additional quantities of concentrates.

18. The method defined in claim 17, further comprising a pretreatment step, wherein concentrates are leached with an aqueous material selected from the group consisting of water and dilute acids, prior to conducting step (a).

19. The method defined in claim 17, wherein the concentration and amount of solution used in step (a) provide a molar ratio of ethylenediaminetetraacetic acid to lead at least about 20.

20. The method defined in claim 17, wherein the solution of ethylenediaminetetraacetic acid has a pH at least about 4.

21. The method defined in claim 20, wherein the pH is at least about 7.

22. The method defined in claim 17, wherein molybdenum is removed from the solution in step (c), by precipitation as a molybdate.

23. The method defined in claim 17, wherein iron and magnesium are removed from the solution in step (c), by hydrolysis.

24. The method defined in claim 17, wherein lead and heavy metal contaminants are removed from the solution in step (c) by precipitation with a sulfide material, selected from the group consisting of sodium sulfides, potassium sulfides, ammonium sulfides, hydrogen sulfide, and mixtures thereof.

25. The method defined in claim 17, wherein leaching in step (a) is conducted under an oxygen-enriched atmosphere.

* * * * *